(12) United States Patent
Rehkemper et al.

(10) Patent No.: US 6,572,378 B1
(45) Date of Patent: Jun. 3, 2003

(54) ELECTRONIC DRAWING ASSIST TOY

(75) Inventors: Steven Rehkemper; Jeffrey Rehkemper, both of Chicago, IL (US)

(73) Assignee: Rehco, LLC, Chicago, IL (US)

(*) Notice: Subject to any disclaimer, the term of this patent is extended or adjusted under 35 U.S.C. 154(b) by 0 days.

(21) Appl. No.: 09/515,601

(22) Filed: Feb. 29, 2000

(51) Int. Cl.[7] .................................. G09B 11/00

(52) U.S. Cl. ..................... 434/85; 434/88; 434/365; 345/173

(58) Field of Search .................. 434/81, 84–88, 434/98, 100, 317, 165, 307 R, 308, 327, 362, 365, 371, 408; 345/173, 473; 315/291, 324; 352/50–52, 87

(56) References Cited

U.S. PATENT DOCUMENTS

| | | | |
|---|---|---|---|
| 4,793,810 A | 12/1988 | Beasley, Jr. | 434/165 |
| 4,952,051 A | 8/1990 | Lovell et al. | 352/87 |
| 5,100,329 A | 3/1992 | Deesen et al. | 434/327 |
| 5,203,702 A | 4/1993 | Wilson | 434/85 |
| 5,513,991 A | 5/1996 | Reynolds et al. | 434/81 |
| 5,533,900 A | 7/1996 | Volk | 434/87 |
| 5,562,452 A | 10/1996 | Atugi et al. | 434/85 |
| 5,769,643 A | 6/1998 | Stevens, III | 434/350 |
| 5,785,528 A | 7/1998 | Jones-Fenleigh et al. | 434/88 |
| 6,211,626 B1 | 4/2001 | Lys et al. | 315/291 |
| 6,238,217 B1 | 5/2001 | Mirando et al. | 434/365 |

*Primary Examiner*—Joe H. Cheng

(57) ABSTRACT

An electronic drawing assist toy comprising a drawing control mechanism operative to selecting a pattern to be displayed. A display screen is arranged in a two dimensional memory array and is selectively energized to sequentially display a selected pattern in response to operation of said control mechanism to assist the user in creating a corresponding drawing.

12 Claims, 7 Drawing Sheets

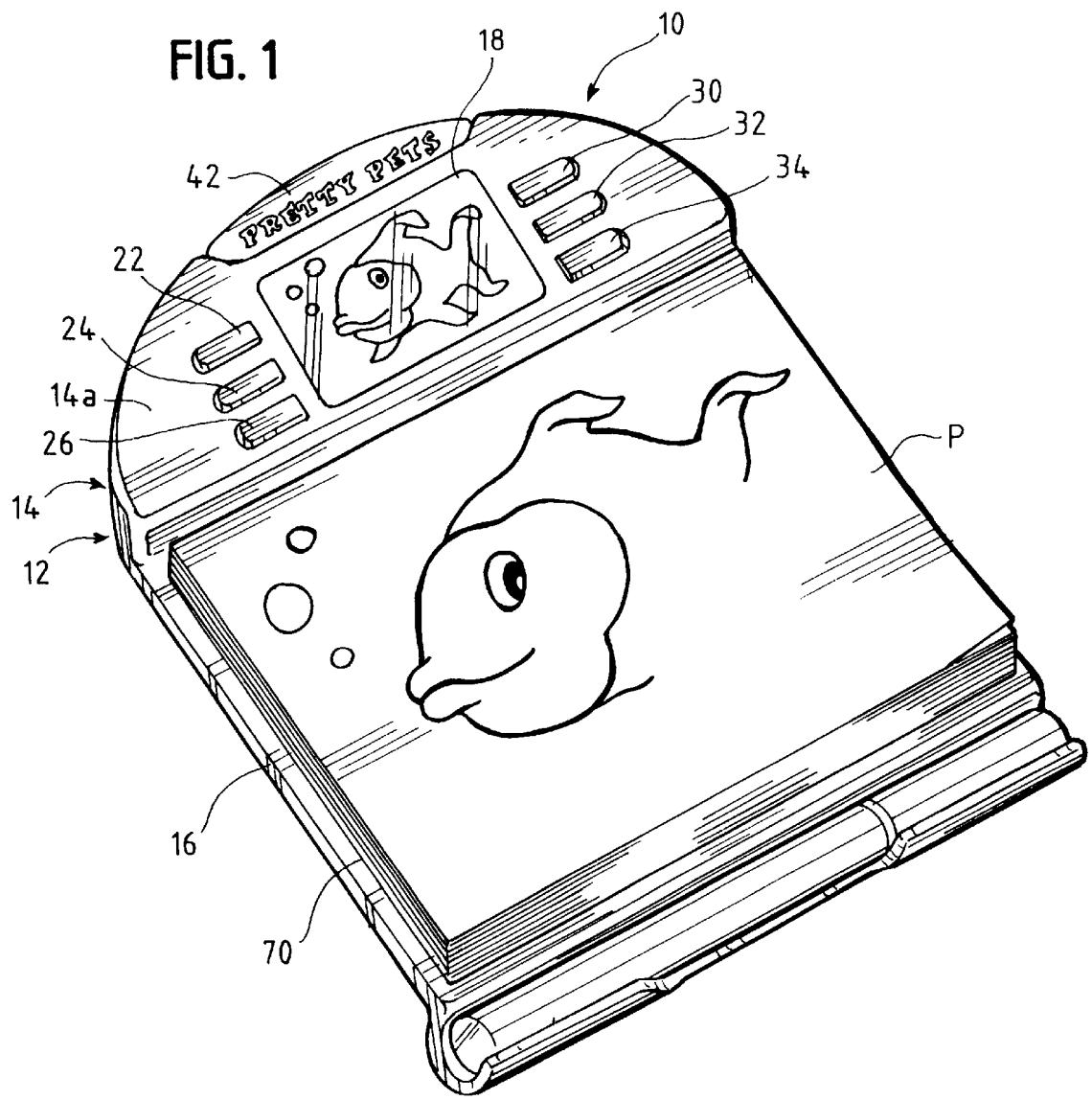

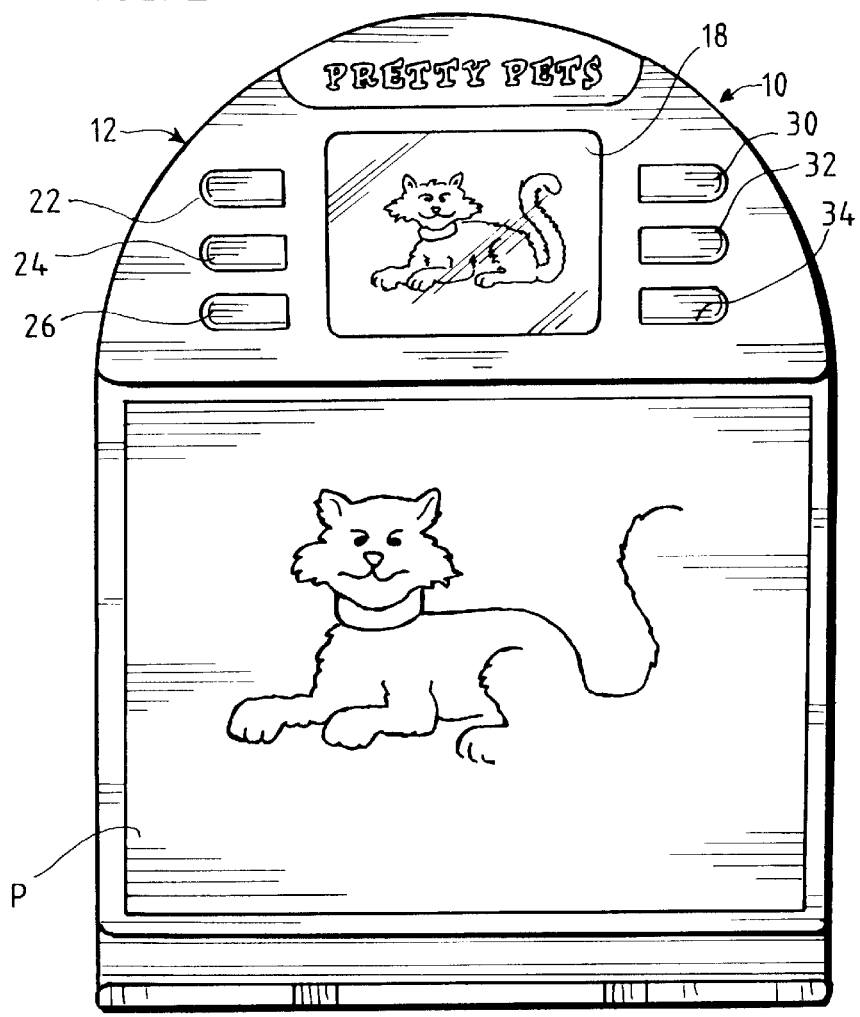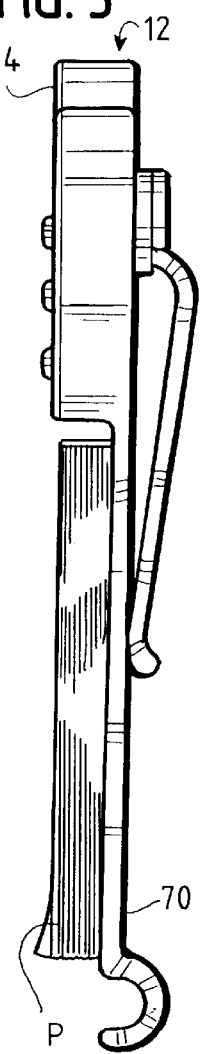

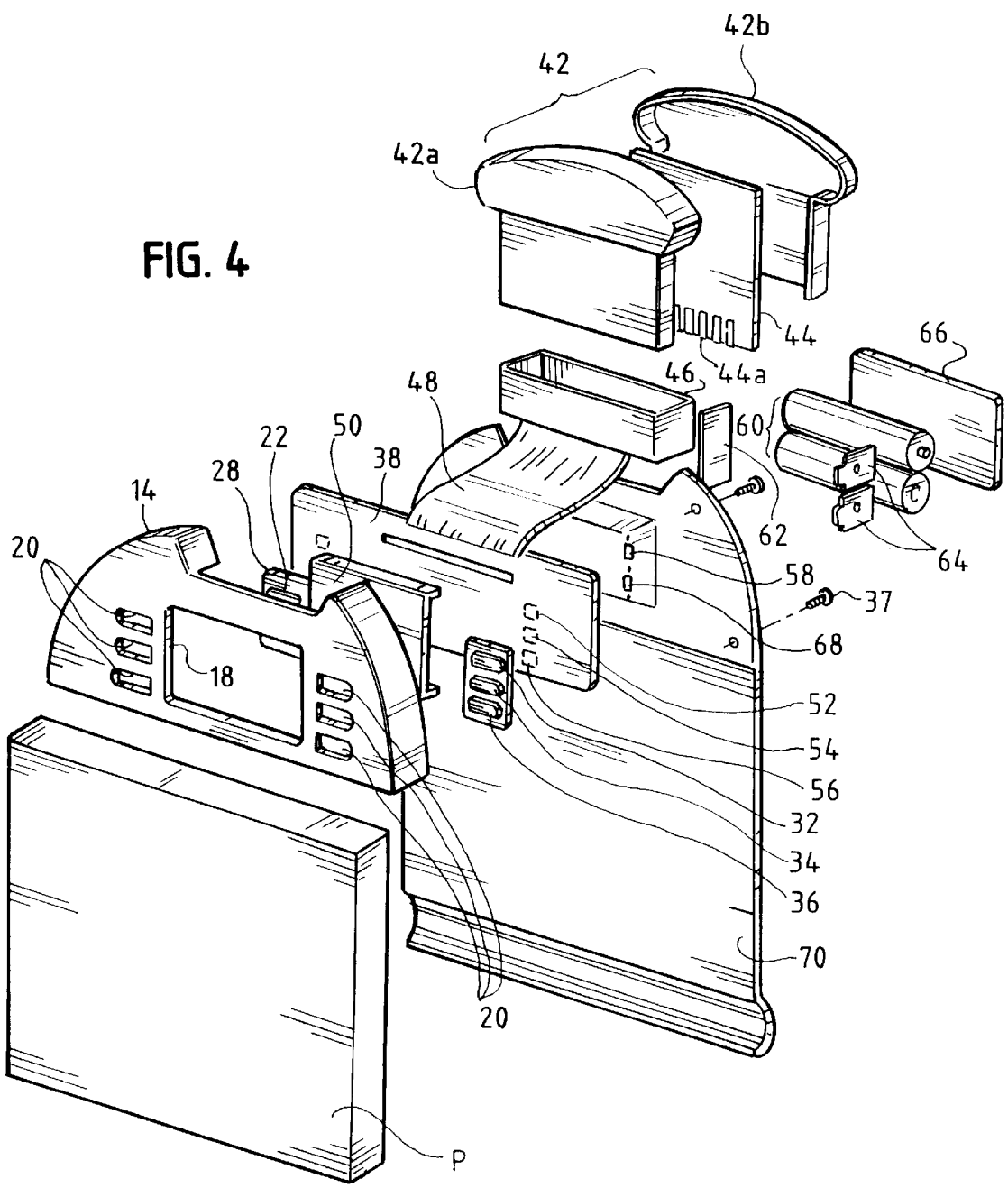

ELECTRONIC DRAWING ASSIST TOY

TECHNICAL FIELD

The present invention relates to line drawing toys, and more particularly to electronic toys that assists the user in making drawings.

BACKGROUND OF THE INVENTION

Drawing is a popular activity. There are a wide variety of items that can be used for drawing. The most basic is paper and drawing tools such as, for example, pencils, pens, and crayons. Self-contained drawing toys exist which provide a convenient way to encourage creativity. These drawing toys are like a reusable pen and paper.

There are a variety of microprocessor based toys and special purpose learning and teaching devices. None appear to be intended for drawing. Sophisticated computer hardware and software can provide drawing capability using a number of graphic and drawing programs. Such devices facilitate drawing of lines by dragging an electronic pointer around the screen. Such computer hardware and software, however, are not inexpensive, and require knowledge of the software, which often is a formidable task. Furthermore, small computers, such as a laptop or hand held devices are probably too costly for use as an inexpensive drawing toy.

Many children, particularly young children may not have an understanding of how to draw figures, even when trying to copy a drawing. They may not know where to begin., where to position other portions of the drawing, or how to produce a desired result. For example, they may not be able to perceive how to connect various portions of a drawing together.

Even those drawing toys that do exist are not intended to assist the user's ability and understanding of how to draw a figure or the various portions thereof to produce the whole. Such assistance would be particularly desirable for helping Young children create drawings. It would be desirable, therefore, to provide a simple electronic drawing toy for children that would encourage creativity. Such a drawing toy would provide assistance so a user can learn how to, and practice making a drawing. Such an assisted drawing toy would be relatively small, would be self-contained, and easy to use.

SUMMARY OF THE INVENTION

In accordance with the present invention there is provided such an electronic drawing assist toy for children. An assist drawing toy incorporating the principles of the present invention would be relatively small., would be self-contained, and easy to use.

An electronic drawing assist toy in accordance with the present invention includes a digital display screen having a plurality of pixels arranged in a two-dimensional array and a memory for storing information to be displayed. A drawing assist toy in accordance with the present invention stores display information representing a graphic or image that can be displayed on the display screen. Upon selection of an image to be displayed, the drawing assist toy in accordance with the present invention selectively displays the selected image incrementally, pixel by pixel, to simulate the drawing of each line or segment which makes up the image to be displayed.

One observing the image being "drawn" or incrementally displayed, typically a young child, can attempt to manually duplicate on a suitable drawing surface, each segment as it appears on the display screen. In this manner the drawing assist toy in accordance with the present invention assists one attempting to create a drawing who observes an incremental display of an image which provides guidance as to what lines to draw in sequence and where to start and when to stop. A disclosed embodiment of the electronic drawing assist toy in accordance with the present invention utilizes relatively simple control mechanisms for 1) selecting an image to be incrementally displayed, 2) for initiating the incremental display of the selected image, 3) for pausing the incremental display to permit the observer time to manually create at least a portion of the drawing corresponding to the most recent segment of the image displayed, 4) for reactivating the incremental image display operation, and 5) for erasing and repeating the incremental display from the beginning.

In an alternative embodiment of the electronic drawing assist toy in accordance with the present invention a stencil is provided to further assist in the creation of a drawing corresponding to the image being incrementally displayed. A stencil is employed having openings corresponding at least in part to one of the stored images in position on the surface on which a drawing is to be created. The stencil includes one or more control members which interact with the electronic drawing assist toy to identify the image to be displayed. Each portion of the image corresponds to a segment of the stencil. As the image is incrementally displayed, the user can trace the corresponding portion of the stencil to create a drawing on the underlying surface.

In a variation of the alternative stencil embodiment, the stencil is supported on a sensing surface. This sensor senses the manual trace of the stencil pattern. When the entire pattern is traced, a complete image is displayed on the display screen to show the complete image. While it is well known to use a stencil on mylar or the like tracing does not teach a child how to draw.

Additionally, the various embodiments of electronic drawing assist toys in accordance with the present invention can include an animation capability. Thus once the image is completely displayed it can become animated in that at least some portion of the image can begin to move. The animation can be enhanced, if desired. For example, by storing a number of different animations in memory, and by keeping a count of the number of times an image is displayed, the image animations can be varied as a function of the count. An audio message may also be produced.

Numerous other advantages and features of the present invention will become readily apparent from the following detailed description of the invention and the disclosed embodiments thereof, from the claims, and from the accompanying drawings in which the details of the invention are fully and completely disclosed as a part of this specification.

BRIEF DESCRIPTION OF THE DRAWINGS

FIG. 1 is a perspective view of an embodiment of an electronic drawing assist toy embodying the principles of the present invention;

FIG. 2 is an plan view thereof;

FIG. 3 is an side view thereof;

FIG. 4 is a perspective exploded view showing the components of an embodiment of an electronic drawing assist toy embodying the principles of the present invention;

DESCRIPTION OF THE PREFERRED EMBODIMENT

Figure 5A:
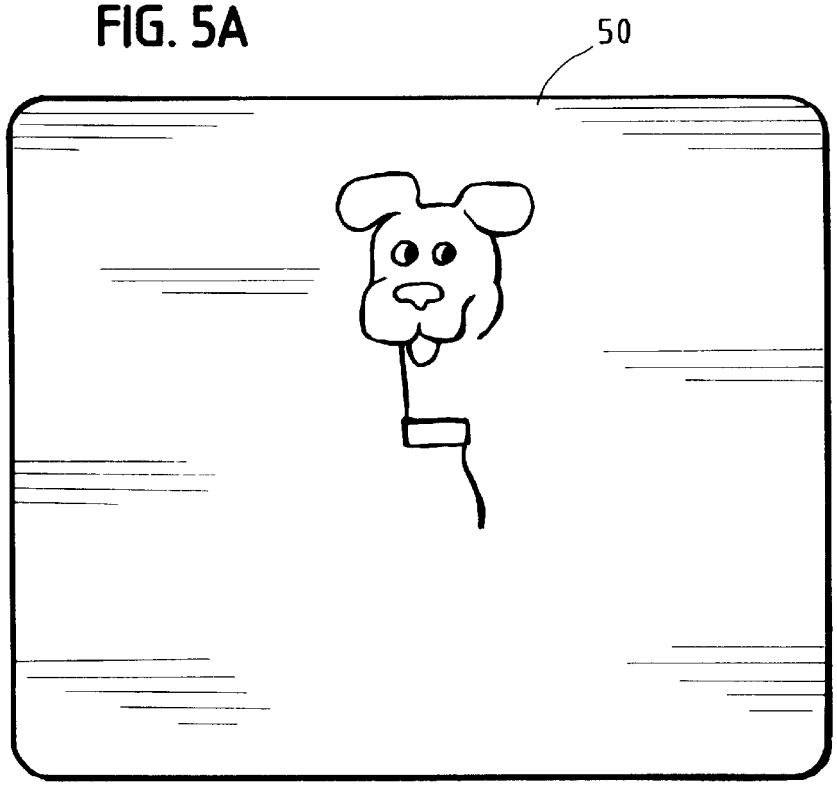
FIGS. 5a and 5b are diagrammatic views showing various displays of a stored image.

While the present invention is susceptible of embodiments in various forms, there is shown in the drawings and will hereinafter be described a presently preferred embodiment thereof, with the understanding that the present disclosure is to be considered as an exemplification of the principles of the invention, and is not intended to limit the invention to the specific embodiments illustrated.

FIGS. 1–4 of the drawings illustrate one embodiment of an electronic drawing assist toy 10 in accordance with the present invention. The toy 10 includes a support and housing 12 composed of a front housing 14 and a rear housing and paper pad support 16. The front wall 14a of the front housing 14 includes a screen view opening 18, and a plurality of additional apertures 20 for receiving two sets of the control buttons, On/Off Button 22, Image Forward Search button 24, and Image Backward Search button 26, of button module 28, (FIG. 4) and the Draw Button 30, Go Back Button 32, and Stop Button 34 of button module 36 (FIG. 4). When the toy 10 is assembled, the front housing 14 is attached to the rear housing 16 by suitable fasteners, such as screws 37 (FIG. 4).

Turning now to FIG. 4 a circuit board 38 is supported by the rear housing and pad support 16. The circuit board 38 supports various components, including a microprocessor and memory. Additional image memory is provided by a removable cartridge 42. The memory cartridge 42 includes front and rear cartridge housings 42a, 42b which are assembled to form the cartridge housing 42. Cartridge housing 42 contains and supports a memory board 44. The memory cartridge 42 is inserted into a cartridge socket 46 supported on, or formed integrally with, the rear housing and pad support 16. The memory board 44 includes contacts 44a which engage the contacts at one end of a connecting cable 48 which are accessible through the bottom of the cartridge socket 46. The other end of the cable 48 is connected to the circuit board 38.

The circuit board 38 supports and is electrically connected to a display device such as LCD display 50. When the toy is assembled, the LCD display 50 is aligned with and can be seen through the screen opening 18 in the front face 14a of the front housing 14. The circuit board 38 includes a number of contacts (not shown) engaged by each of the control buttons 22, 24, 26, respectively, and a number of contacts 52, 54, 56 engaged by each of the control buttons 30, 32 34, respectively. When the toy 10 is assembled, the circuit board 38 supports the button modules 28, 36 with the individual buttons passing through the button apertures 20. Each of the buttons can be depressed to engage the corresponding contacts on the circuit board 38.

The rear housing and pad support 16 also defines a battery compartment 58, for batteries 60 and battery contacts 62, 64. The batteries 60 are inserted through a battery compartment opening (not shown), formed in the back wall of the rear housing and pad support 16 which is closed by a battery compartment door 66. The tips of battery contacts 64, supported in the battery compartment 58, extend through battery compartment contact slots 68 and make contact with, and are electrically connected to the circuit board 38.

The rear housing and pad support 16 includes a lower pad supporting portion 70 which extends beyond the lower edge of the front housing 14. The lower pad supporting portion 70 provides support for a drawing pad on which the images displayed on the LCD screen can be manually reproduced.

The toy is turned on and off by operating, e.g., depressing. The On/Off Button 22. Data corresponding to a plurality of images that can be displayed on the LCD display 50 are, stored in the memory cartridge 40 and can be displayed in sequence. An image stored in memory is selected by operating either the Forward Search Button 24 or the Back Search Button 26. Each time the Forward Search Button 24 is pushed, the next image in the sequence of data stored in memory is displayed. Each time the Back Search Button to is pushed, the previous image in the sequence of data stored in memory is displayed.

Figure 5B:
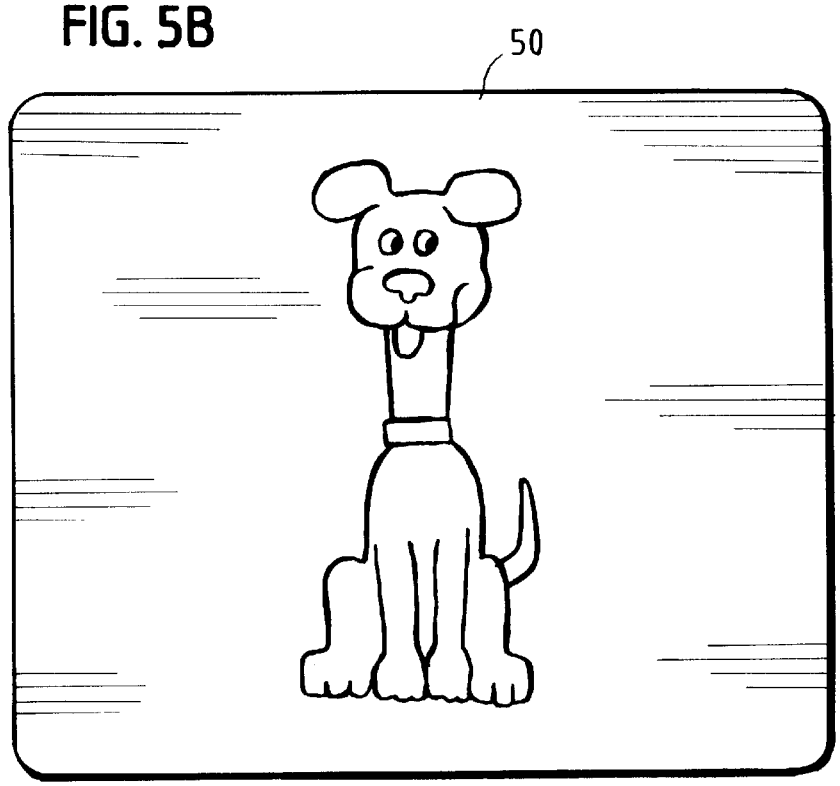

The Draw Button 30 is operated to display the desired image. The LCD display is cleared and each element, e.g., pixel, of the LCD display 50 is energized sequentially, pixel by pixel, to slowly display the selected image segment by segment. It is intended that the image so displayed be manually reproduced on the drawing pad as the image is displayed. The relatively slow pace of the display acts to assist and illustrate how the image can be drawn, segment by segment. If desired, the display of the image can be paused by operation of the Stop Button 34 before the entire image is displayed, as indicated in FIG. 5a. The sequential display of the selected image can be resumed, by operating the Draw Button 30, and stopped repeatedly, until the entire image is displayed, see, e.g., FIG. 5b. The Go Back Button 32 is operated to clear the LCD display 50 and restart the display of the selected image from the beginning.

Figure 6:
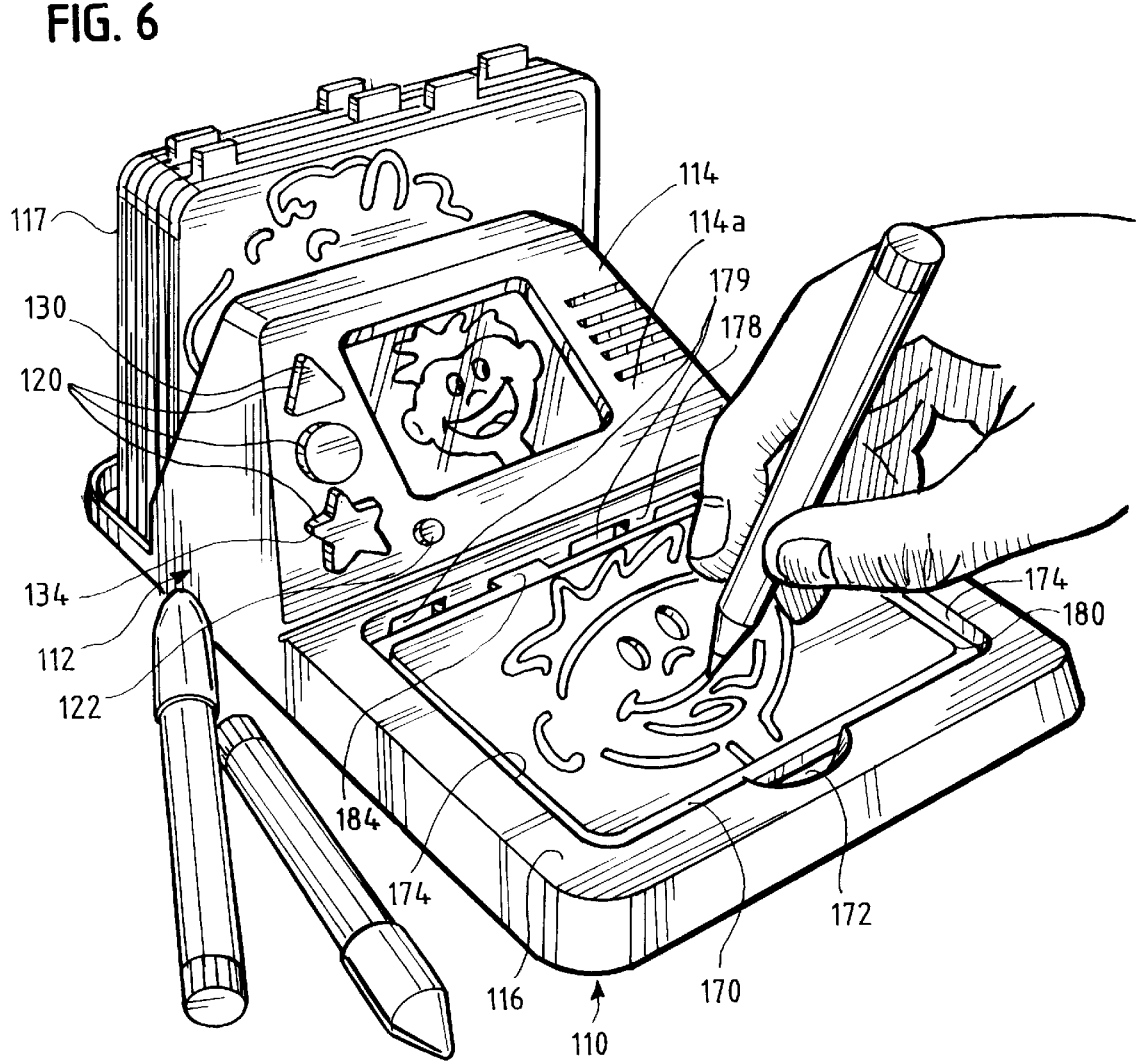
FIG. 6 is a perspective view of another embodiment of an electronic drawing assist toy embodying the principles of the present invention.
Figure 7:
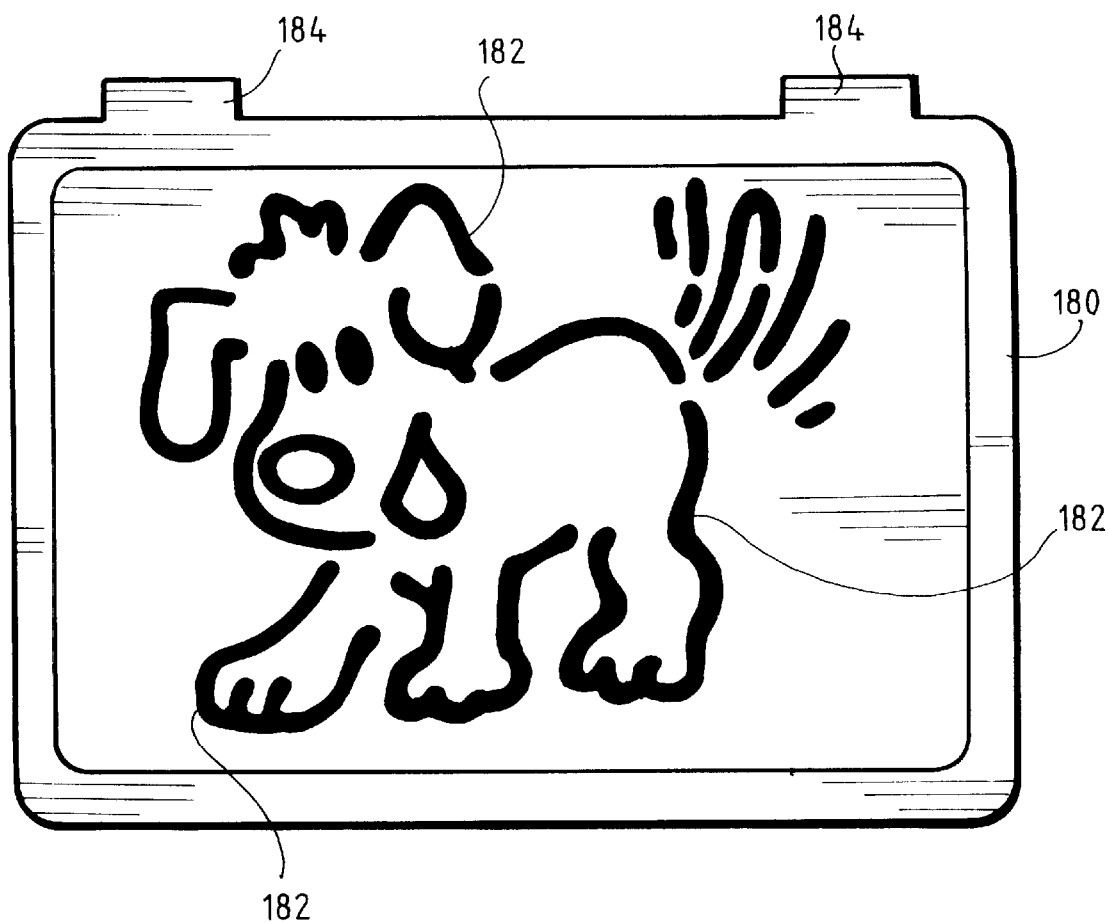
FIG. 7 is plan view of a stencil used in the embodiment of the toy shown in FIG. 6.
Figure 8A:
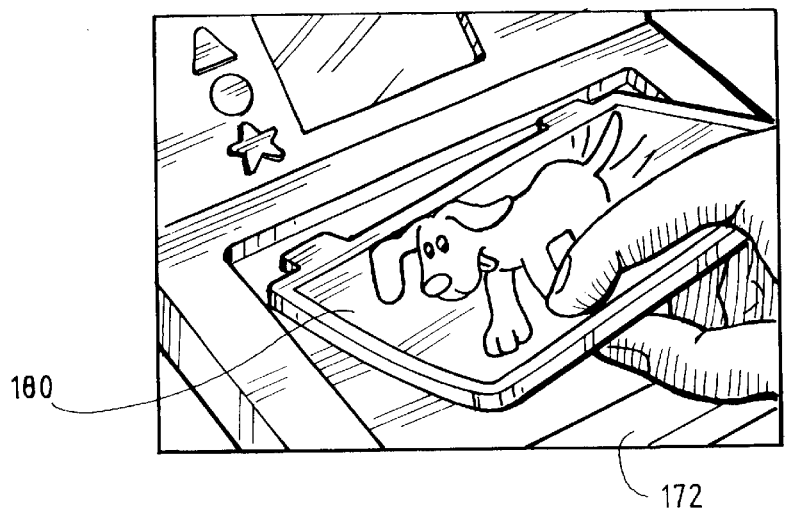
FIGS. 8a, 8b and 8c are diagrammatic views illustrating the use of the toy shown in FIG. 6.
Figure 8B:
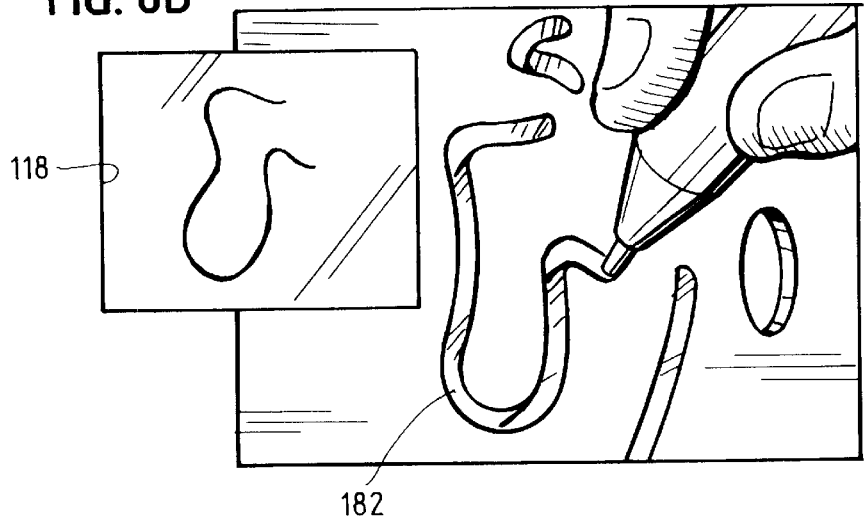
Figure 8C:
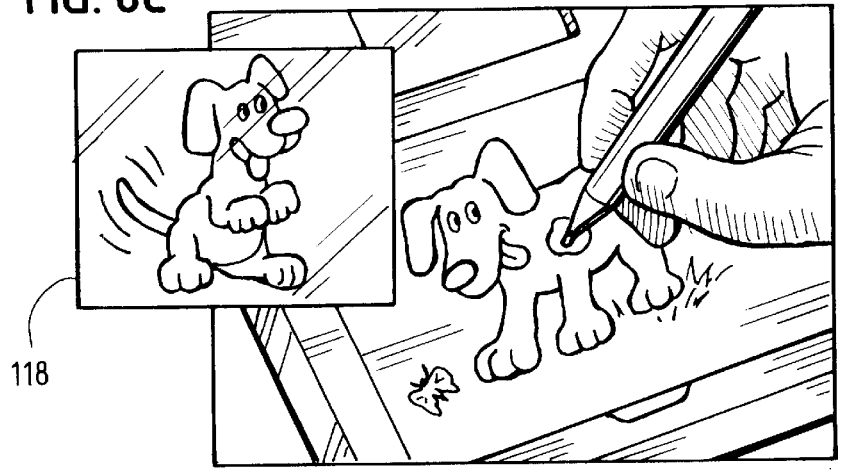

FIGS. 6–8 of the drawings illustrate another embodiment of an electronic drawing assist toy 110 in accordance with the present invention. The toy 10 includes a support and housing 112. The housing 112 includes a raised display portion 114, a lower tray portion 116 and a stencil card storage portion 117. The front wall 114a of the display portion 114 includes a screen view opening 118, and a plurality of additional apertures 120 for receiving a set of the control buttons, On/Off Button 122, the Draw Button 130, Go Back Button 132, and Stop Button 134. The housing also defines a battery compartment for batteries and battery contacts, for receiving batteries that provide power for the toy, as discussed above.

A circuit board is supported inside the display portion. The circuit board supports the various components including a microprocessor, and memory. Although not shown, additional image memory may be provided by removable cartridges, similar to those described above, which could be inserted into a suitable socket formed in the top of the raised display portion 114 of the housing 112.

The circuit board supports and is electrically connected to the batteries, and to a display device such as LCD display 150, which is aligned with and can be seen through the screen opening 118. The circuit board 38 includes a number of contacts (not shown) engaged by each of the control buttons 122, 130, 132, 134, respectively. The individual buttons pass through the apertures 120. Each of the buttons can be depressed to engage corresponding contacts on the circuit board 138.

A recessed pad and stencil support tray 170 is formed in the lower tray portion 116 of the housing 112 adjacent the lower edge of the display portion 114. The recessed tray 170 includes a support surface 172, side walls 174, a bottom wall 176 and a top wall 178 which incorporates a plurality of stencil card tab openings 179. The recessed tray 170 provides support for a drawing pad on which the images displayed on the LCD screen can be manually reproduced, and for a stencil card 180 positioned on top of the pad. As shown in the drawings', a stencil card 180 includes a number of slots 182 which form the segments if an image to be drawn. The slots are wide enough to allow the point of a drawing implement such as a crayon or pencil to pass through and engage the surface of the underlying pad. In this manner the slots 182 in each stencil card 180 serve as guides to assist in the creation of a drawing, Each stencil card 180 includes a unique combination of identification tabs 184 along one edge of the card. When a stencil card 180 is inserted into the recessed tray 170, the tabs 184 are inserted through corresponding tab openings 179 formed in the top wall 178 of the recessed tray 170. The unique combination of tabs 184 on each stencil card 180 engage switches or contacts on the circuit board to select the image to be displayed.

The toy is turned on by operating, e.g., depressing the On/Off Button 22, and is turned off by operating, e.g., depressing the On/Off Button 22 again. Data corresponding to a plurality of images that can be displayed on the LCD display 50 are stored in the internal memory or in a memory cartridge, if incorporated into the toy 110. An image stored in memory is selected by the unique combination of tabs 184 on the stencil card 180 inserted through the tab openings 179, as shown in FIG. 8a.

In one version of the toy 110, the desired image is displayed when the stencil is inserted and the On/Off button is operated. When the Draw Button 30 is operated, the LCD display is cleared and each element, e.g., pixel, of the LCD display 50 is energized relatively, pixel by pixel, to slowly display the selected image segment by segment. For example to display an eye, segments of a circle will be illustrated until the eye is complete. The stencil card 180 includes a plurality of slots corresponding to the segments being displayed. This facilitates the manual creation of a corresponding drawing on the drawing surface, e.g. paper, disposed under the stencil. The image is manually reproduced on the drawing surface by inserting a drawing tool, e.g., a pencil or crayon, into a slot 182 corresponding to the segment being displayed on the LCD screen 150 as the image is displayed, as shown in FIG. 8b.

The relatively slow pace of the display acts to assist and illustrate how the image can be drawn, segment by segment. If desired, the display of the image can be paused by operation of the Stop Button 34 before the entire image is displayed, as indicated in FIG. 5a. The display of the selected image can be resumed by operating the Draw Button 30, until the entire image is displayed, see, e.g. FIG. 5b. Specifically it can be programmed to hit a start button after which a segment is illustrated and then stopped until the go button is hit again for another segment. It can also be programmed to continue to show segments at a pace to be selected by the child using the toy. A mode button could be included to select the mode desired. The Go back Button 32 is operated to clear the LCD display 50 and restart the display of the selected image from the beginning or if desired to take away a segment one at a time.

In another version of the toy 110, support surface 172a of the recessed tray 170 includes a sensing member. The sensing member includes sufficient sensors so there is one sensor located adjacent the ends of each stencil slot 182. For example, the sensing member may be a pressure sensitive membrane, which are well known, which produces an output identifying a position on the sensing member to which pressure is applied, such as by the end of a drawing tool inserted into a stencil slot 182. An array of switches on a prescribed grid could be provided with a drawing designed around the grid.

In this version, each portion of the image is manually produced on the drawing surface by inserting a drawing tool, e.g., a pencil or crayon, into a stencil slot 182, and drawing the segment defined by the slot. The active sensors are determined by the image selected when the tabs 184 are inserted into the tab openings 179 formed in the top wall 178 of the recessed tray 170. When the active sensors for a stencil slot have sensed the pressure produced by a drawing tool, the corresponding segment is displayed on the LCD display 150.

When the image is completely displayed, it can become animated as is well known. A corresponding audio output can also be produced. When the stencil card is removed, the drawing that has been created in outline by tracing the stencil can be embellished as desired.

Thus there has been disclosed an electronic drawing assist toy which is small and self contained, which is easy to use, and which can be used to illustrate how a variety of patterns or images can be drawn. Such a drawing assist toy can encourage creativity by showing children how to create patterns that are combined to produce images.

The electronic drawing assist toy 10 incorporating the present invention is implemented using a simple microprocessor as is well known For example, a digital display is driven by the microprocessor. One suitable display is an LCD 64×64 pixel screen. Memory is provided for storage information about the information to be displayed.

From the foregoing, it will be observed that numerous modifications and variations can be effected without departing from the true spirit and scope of the novel concept of the present invention. It is to be understood that no limitation with respect to the specific embodiments illustrated is intended or should be inferred. It is, of course, intended to cover by the appended claims all such modifications as fall within the scope of the claims.

What is claimed is:

1. An electronic drawing assist toy comprising a memory for storing at least one image;

a digital display having a plurality of display elements arranged in a two-dimensional array, each being capable when energized of displaying a component of the stored image;

manually operable control mechanism for selectively operating said digital display and energizing various ones of said display elements to successively display selected portions of the stored image;

said control mechanism being further manually operable to suspend continued energization of said digital display elements and the display of further portions of the stored image; and a support for a drawing surface on which the displayed image can be reproduced;

whereby a user is assisted in the manual reproduction of the displayed portions of the stored image and thereby in the creation on the drawing surface of a drawing corresponding to the displayed stored image.

2. An electronic drawing assist toy of claim 1 wherein:

said control mechanism is further manually operable to reenergize said digital display elements and the display of additional portions of the stored image.

3. An electronic drawing assist toy of claim 1 wherein:

the stored image is composed of a plurality of segments each capable of being displayed by energizing a plurality of adjacent display elements; and wherein operation of said control mechanism to energize said display elements sequentially energizes adjacent ones of the display elements for each image segment to simulate the drawing of each of the image segments and illustrate the manner of creating each such segment, thereby assisting an observer in the manual creation of the segments corresponding thereto.

4. An electronic drawing assist toy of claim 1 wherein:

said control mechanism is further manually operable to de-energize said digital display elements and thereby erase the display of the stored image.

5. An electronic drawing assist toy of claim 1 wherein:

said memory stores a plurality of images for display;

and said manually operable control mechanism is operable to select one of the stored images to be displayed.

6. An electronic drawing assist toy of claim 1 in which the memory is in the form of a removable cartridge.

7. A method for assisting in the manual reproduction of an electronically stored image comprising storing an image in an electronic memory;

selectively and sequentially displaying selected portions of the stored image on a digital display;

selectively interrupting said sequential display of the selected image portions to permit a user to manually reproduce the displayed portion of the stored image on a drawing surface;

selectively resuming the sequentially display of additional portions of the stored image on a digital display;

whereby a user is assisted in the manual reproduction of the displayed portions of the stored image and thereby in the creation on the drawing surface of a drawing corresponding to the displayed stored image.

8. An electronic drawing assist toy comprising a memory for storing data corresponding to a plurality of images;

an digital display having a plurality of display elements arranged in a two-dimensional array each being capable when energized of displaying a component of the stored image;

a stencil receiving portion for receiving and supporting a stencil member;

a stencil member containing a stencil pattern corresponding to one of said stored images;

said stencil member including image selection portions operable when said stencil is positioned in said stencil receiving portion to select one of the stored images corresponding to the stencil pattern;

a manually operable control mechanism for selectively operating said digital display and energizing various ones of said display elements to successively display selected portions of the selected stored image corresponding to portions of the stencil patterns of the stencil member disposed in said stencil receiving portion;

whereby a user is assisted in the manual reproduction of the displayed portion of the stored image and thereby in the creation of a drawing corresponding to the displayed stored image by the sequential display of the image elements and by use of the corresponding stencil patterns.

9. An electronic drawing assist toy comprising a memory for storing data corresponding to a plurality of images;

a digital display having a plurality of display elements arranged in a two-dimensional array, each being capable when energized of displaying a component of the stored image;

a stencil receiving portion for receiving and supporting a stencil member;

a stencil member containing slots forming a stencil pattern corresponding to one of said stored images;

said stencil member including image selection portions operable when said stencil is positioned in said stencil receiving portion to select one of the stored images corresponding to the stencil pattern;

said stencil receiving portion including a sensing member juxtaposed with said stencil member when positioned in said stencil receiving portion and being actuated in response to pressure applied to selected locations thereof by a drawing tool inserted through said stencil slots;

said locations of said sensing member being selected by said image selection portions and being located under the slots of said stencil corresponding to the selected image;

automatically operable control mechanism for selectively operating said digital display and energizing various ones of said display elements to successively display each selected portion of the selected stored image corresponding to a slot in said stencil in response to actuation of said selected portions of said sensing member actuated by a drawing tool inserted into said slot of the stencil member disposed in said stencil receiving portion;

whereby a user is assisted in the manual reproduction of the image represented by said stencil and thereby in the creation of a drawing corresponding to the stored image by the sequential display of the image elements in response to use of the corresponding stencil patterns.

10. An electronic drawing assist toy of claim 9 wherein:

said selected portions of said sensing member are located adjacent opposite ends of each slot in said stencil; and wherein an automatically operable control mechanism energizes said display to display a segment corresponding to a slot in said stencil in response to a drawing tool being moved from one end to another of a corresponding slot of said stencil slot to actuate all of said selected sensing portions.

11. An electronic drawing assist toy of claim 9 wherein:

said automatically operable control mechanism is responsive to actuation of all of said selected portions of said sensing member for displaying the entire stored image.

12. An electronic drawing assist toy of claim 11 wherein:

said automatically operable control mechanism is responsive to actuation of all of said selected portions of said sensing member for animating the display of the entire stored image.

* * * * *